United States Patent [19]

Obrist

[11] Patent Number: 5,242,359
[45] Date of Patent: Sep. 7, 1993

[54] MANUFACTURING PLANT

[75] Inventor: Basil Obrist, Gontenschwil, Switzerland

[73] Assignee: Erowa AG, Reinach, Switzerland

[21] Appl. No.: 893,989

[22] Filed: Jun. 3, 1992

[30] Foreign Application Priority Data

Jun. 3, 1991 [DE] Fed. Rep. of Germany ....... 4118108

[51] Int. Cl.⁵ .................. B23Q 3/155; B65G 1/00
[52] U.S. Cl. .................. 483/15; 211/1.52; 414/267; 483/37; 483/63
[58] Field of Search ............... 483/63, 64, 67, 37, 483/14, 15; 211/1.52, 1.55; 414/267, 277

[56] References Cited

U.S. PATENT DOCUMENTS

| | | | |
|---|---|---|---|
| 3,546,774 | 12/1970 | Stoferle | 483/67 X |
| 4,240,194 | 12/1980 | Inami et al. | 483/37 |
| 4,344,221 | 8/1982 | Pagani | 483/67 X |
| 4,558,506 | 12/1985 | Kielma | 483/67 |
| 4,625,387 | 12/1986 | Stoilov | 483/63 |
| 4,845,835 | 7/1989 | Schneider | 483/67 X |

FOREIGN PATENT DOCUMENTS

| | | | |
|---|---|---|---|
| 0132599 | 6/1984 | European Pat. Off. | |
| 0297034 | 6/1988 | European Pat. Off. | |
| 3424178 | 4/1985 | Fed. Rep. of Germany | 483/67 |
| 216667 | 12/1984 | German Democratic Rep. | 483/63 |
| 201739 | 11/1984 | Japan | 483/63 |
| 71937 | 4/1986 | Japan | 483/64 |

OTHER PUBLICATIONS

Moglichkeiten und Trends bei der automatischen Werkstuckhandhabung mit Industrierobotern, pp. 585–589, Published in "Zeitschrift fur Industrielle Fertigung", 1986.

Primary Examiner—William Briggs
Attorney, Agent, or Firm—Tarolli, Sundheim & Covell

[57] ABSTRACT

The manufacturing plant comprises at least one manufacturing cell provided with at least one processing device, a handling device associated with the processing device in order to automatically exchange tools and/or workpieces on the processing device, and a magazine for the objects to be handled arranged in the reach of the handling device. The magazine is provided with a rotating rack having a plurality of storing planes mounted upon another on a support. The manufacturing plant comprises a plurality of such rotating racks. The rotating racks are designed as separate transportable constructional units which are exchangeably inserted in a stationary part of the magazine. The stationary part comprises means for rotating the rotating rack. The manufacturing plant further comprises a transfer station separate from the manufacturing cell for loading and unloading the rotating racks. Transporting means, e.g. at least one floor conveying truck, are provided for transporting the rotating racks between the transfer station and the magazine. The rotating racks can be automaticly exchanged and be unloaded and reloaded outside the magazine station. The exchange of the magazine can be effected without interruption of the manufacturing process. A plurality of manufacturing cells can be operationally linked by the transporting means which transmit the rotating racks farther from manufacturing cell to manufacturing cell.

22 Claims, 10 Drawing Sheets

MANUFACTURING PLANT

TECHNICAL FIELD

This invention relates to a manufacturing plant comprising at least one manufacturing cell, which manufacturing cell comprises at least one processing device, a handling device associated with the processing device in order to automatically exchange tools and/or workpieces on the processing device, and a magazine for the objects to be handled arranged in the reach of the handling device, the magazine being provided with a rotating rack having a plurality of storing planes mounted upon another on a support.

BACKGROUND OF THE INVENTION

Manufacturing plants of this kind are disclosed e.g. in the publications EP-A1-0,132,599 and EP-A2-0,297,034. The magazines mentioned therein are also known under the designation "multi-level revolving storage machines".

If a manufacturing plant is run non-attended and for a prolonger period of time, it may be necessary to place at disposal a considerable number of workpieces and tools, especially if the machining processes are quickly changing. This means that relatively large magazine space and handling devices covering wide areas are necessary. In this case, according to the status of the art, for operating one or more processing devices, often a plurality of multi-level revolving storage machines and, e.g., a portal robot are necessary, such as e.g. described in the publication "Möglichkeiten und Trends bei der automatischen Werkstückhandhabung mit Industrierobotern" ["Possibilities and trends in the automatic workpiece handling by industrial robots"], published in "Zeitschrift für industrielle Fertigung" 1986, No. 10, 76 (Springer-Verlag). It is known from experience that in this case the material expenditure and the space requirement are important. Furthermore, due to the largeness of the magazine spaces, the interruption time for restocking the magazines at their respective positions is long.

OBJECTS OF THE INVENTION

It is a primary object of the present invention to provide a conception for operating a manufacturing plant which avoids the abovementioned disadvantages of the prior art.

Further objects of the present invention will become evident from the following specification.

SUMMARY OF THE INVENTION

To meet this and other objects, the present invention provides a manufacturing plant comprising at least one manufacturing cell, each of them comprising at least one processing device. Further, there is provided a handling device associated with the processing device in order to automatically exchange tools and/or workpieces on the processing device. A magazine for the objects to be handled is arranged in the reach of said device. The magazine is provided with a rotating rack having a plurality of storing planes mounted upon another on a support.

The manufacturing plant includes a plurality of rotating racks which are designed as transportable constructional units exchangeably insertable in a stationary part of the magazine. The stationary part comprises means for rotating said rotating racks. Further, there are provided a transfer station separated form the manufacturing cell for loading and unloading the rotating racks and transporting means for transporting the rotating racks form the transfer station to the magazine station, and vice versa.

In this way, it is possible to provide just a small storage capacity at the magazine station, and to use a simplier handling device for serving the processing device. Moreover, the access time to the magazine is reduced. The exchangeable rotating rack can periodically, or according to the requirements, be replaced by a rotating rack having new workpieces and tools, respectively, and be discharged and recharged outside the magazine station. The exchange can take place without interruption of the manufacturing process.

In a manufacturing plant having a plurality of manufacturing cells, the manufacturing cells can be operationally linked by leading the lane of the transporting means past all manufacturing cells, and by forwarding the magazines loaded with the objects to be handled form manufacturing cell to manufacturing cell by means of the transporting means.

Preferably, the transfer station comprises a buffer stock for intermediately stocking rotating racks prepared for use in the magazine stations.

Preferably, the transporting means for the rotating racks are constituted by at least one floor conveying truck. In particular, the floor conveying truck may be automatically operated and guided on lanes which connect the magazine stations of the manufacturing cells with one another and with the transfer station. Such lanes may also be located between the pick-up places of the transfer station and the buffer stock.

Preferably, the rotating racks are provided at the lower end of their rotating support with a foot plate forming the base for transporting them in an upright position.

Preferably, said floor conveying truck and the transfer station are provided with pick-up places for one rotating rack each, whereby the pick-up places comprising holding means for transporting and for handling the rotating racks in the transfer station. The floor conveying truck comprises at least two pick-up places for one rotating rack each, so that there are at least one pick-up place for one rotating rack used in a magazine, and a vacant pick-up place for taking up of a rotating rack to be replaced.

In order to facilitate the transfer of the rotating racks form the magazine station to the floor conveying truck, and vice versa, and to automate this transfer, if desired, the stationary part of the magazine and each of the pick-up places of the floor conveying truck and of the transfer station may comprise one conveyer system each, having a horizontal conveyer, the conveyers of all conveyer systems being located on the same level. The conveyer systems may e.g. be roller conveyers comprising jointly driven rollers.

Each pick-up place of the transfer station preferably comprises a bogie and a lifting device for transferring a rotating rack from the conveyer system to the bogie, and vice versa. The construction may be such that the rotating rack is freely rotatable when placed with its foot plate on the bogie, so that it can simply and comfortably be loaded and unloaded.

For this purpose, the bogie may comprise a set of rollers arranged in a circle, and a pivot adapted to engage a centering sleeve on the rotating rack foot plate, said set of rollers and said pivot being individually movable in vertical direction by means of a lifting device.

Furthermore, the respective conveyer systems preferably comprise auxiliary means for ensuring that the rotating racks reach and maintain, respectively, the desired positions. Thus, e.g., guide means are mounted along the conveyer of each conveyer system at the circumference of the foot plate for longitudinally guiding the rotating rack. Furthermore, the conveyer of the conveyer systems which are associated with the magazine station and the transfer station may comprise a stopper for stopping the incoming rotating rack in the are of action of the respective holding means.

Finally, retaining shoulders may be provided along the conveyer of the conveyer system associated with the floor conveying truck, said retaining shoulders overlapping the foot plates of the rotating rack, in order to prevent the rotating rack from tipping.

In a practical embodiment of the magazine, its stationary part comprises a stand provided with disengageable clutch means for bearing and driving the rotating rack. Preferably, the disengageable clutch means cooperate with both ends of the rotating support of the rotating rack.

In a preferred embodiment of the magazine, the rotating support of the rotating rack is provided at its lower end with a foot plate having a centering sleeve which is downwardly open, and at its upper end with a centering cone. The lower part of the stand comprises a driven rotating stool bearing the rotating rack, the rotating stool being provided with an upwardly extending centering pin engaging the centering sleeve of the foot plate. The upper part of the stand comprises a shaft end provided with a downwardly open, freely rotatable conic center hole for taking up the centering cone of the rotating support. The rotating stool, together with a turnable drive unit for rotating the same, are mounted on a elevating platform forcing the rotating rack upwardly, in order to interlockingly position and hold the rotating support of the rotating rack between the rotating stool and the shaft end, and to frictionally connect the foot plate with the rotating stool.

Preferably, the rotating rack can be lowered from its operation position to a point where its foot plate touches the conveyer and the clutch means, upon disengagement from the rotating rack, release the latter in the conveying direction.

The means for transferring the rotating rack from its operating position to the conveyer system may e.g. be constructed in such a waw that the elevating platform can be lowered from its operation position to a point where the centering pin on the rotating stool disengages from the centering sleeve on the end of the rotating support after the rotating rack was placed onto the conveyer system, and that the shaft end can upwardly be drawn-off for disengaging the centering cone on the upper end of the rotating support from the conic center hole on the shaft end. This allows that the disengagement of the rotating rack from the disengageable clutch means be effected in two phases, i.e. in the first phase the rotating rack is placed onto the conveyer system, while the upper clutch means are still engaged and the lower clutch means are disengaged, and in the second phase the upper clutch means are disengaged from the rotating rack.

BRIEF DESCRIPTION OF THE DRAWINGS

In the following, an embodiment of the manufacturing plant and of its elements will be further described, with reference to the accompanying drawings, in which.

DESCRIPTION OF A PREFERRED EMBODIMENT

Now, as an example, a preferred embodiment of the present invention will be described in more detail with reference to the drawings.

The magazine, which is shown as an example, comprises a stand 1 consisting of rectangular tubes and having a square horizontal projection. This stand 1 is of a height corresponding to the rotating rack 2, which is separately shown in FIG. 4, and comprises the stationary part of the magazine including the means for revolving operation of said rotating rack 2. The individual parts of this stand 1 will be described more in detail below, according to requirements.

Figure 3:
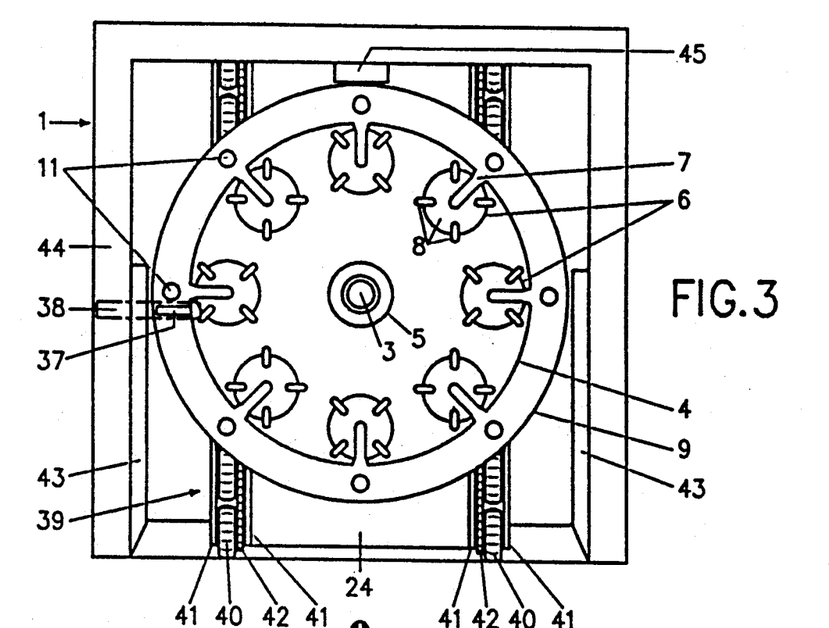
FIG. 3 is a horizontal projection of the magazine of FIG. 1.
Figure 4:
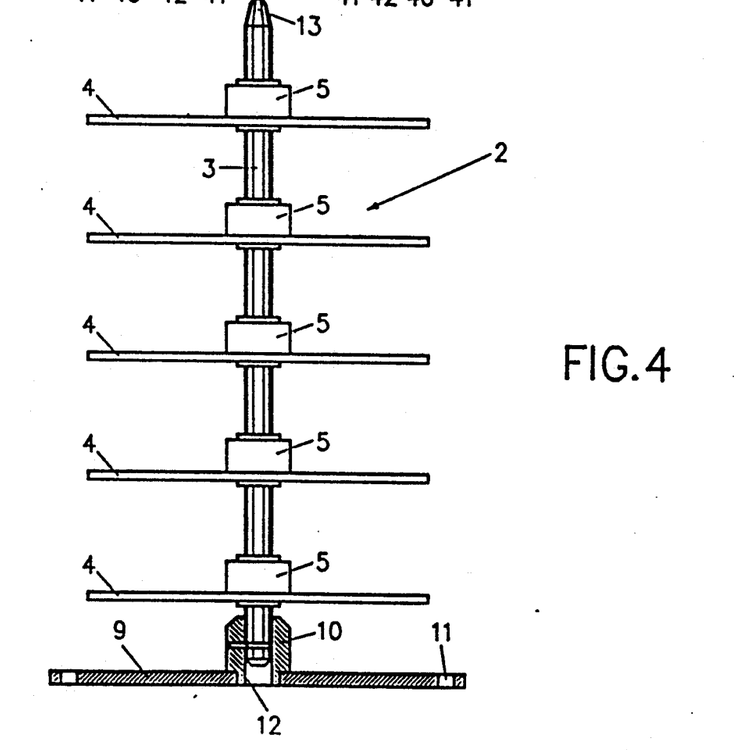
FIG. 4 is a side elevation of the exchangeable rotating rack designed as a separate constructional unit.

As shown in FIG. 4, the rotating rack, generally marked by "2", comprises, in a manner known per se, a rotating support 3 supporting a number of bearers 4 for the objects to be handled (workpieces and/or tools). Said bearers 4 are shaped as circular plates, and are mounted at equal distances on several levels on said rotating support 3. For this purpose, each of the bearers 4 is provided with a hub 5 which is fixed (in a manner not shown in detail) to said rotating support 3, e.g. by means of pins. As shown in FIG. 3, each bearer 4 comprises at its circumference a number of storage places 6, e.g. eight places. These storage places 6 are all of the same construction and may e.g. comprise a radial incision 7 and an axial recess 8 for correctly positioning the objects to be handled.

At its lower end, the rotating support 3 of the rotating rack 2 is provided with a foot plate 9 which may be fixed to the rotating support 3 by means of a hub 10, in a manner similar to that of the bearers 4. The foot plate 9 has a somewhat larger diameter than the bearers 4, and is provided near its circumference with a number of locking holes 11, e.g. eight locking holes, for positioning the rotating rack 2 in various angular positions. The hub 10 situated at the lower end of the rotating support 3 also forms an upwardly open centering sleeve 12. At its upper end, the rotating support 3 comprises a centering cone 13.

Clutch means are mounted on the stand 1 for bearing and operating the rotating rack 2. The clutch means cooperate with the ends of the rotating support 3 which are constructed as described above. The lower part of the stand 1 comprises a rotating stool 14 which bears the rotating rack 2 in its operational position, as shown in FIGS. 1 and 2.

Figure 6:
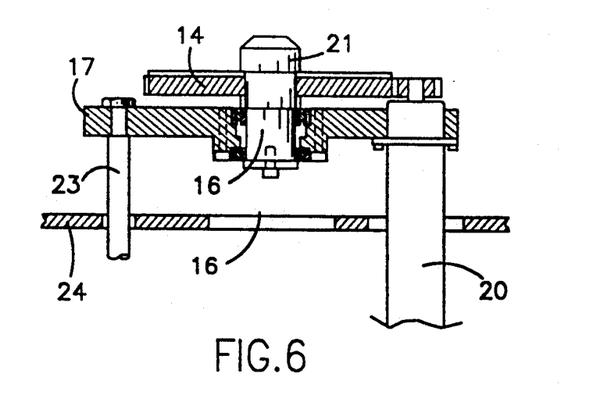
FIG. 6 is a sectional view, in a larger scale, of the lower clutch means in working order.
Figure 7:
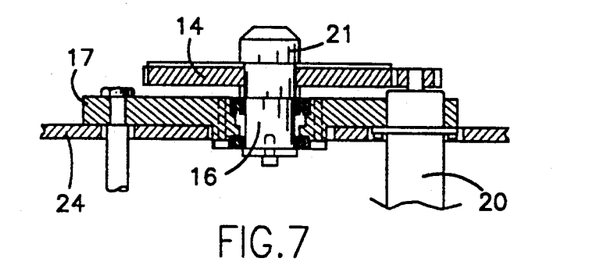
FIG. 7 is a sectional view analogous to FIG. 6, but showing the clutch means in disengaged position.

Details of this rotating stool 14 are shown in FIGS. 6 and 7. For frictionally connecting the rotating rack and the rotating stool 14, the latter is provided with a friction lining 15. The rotating stool 14 is mounted on a shaft 16, these two elements being rotatably mounted on an elevating platform 17 in the manner shown. The rotating stool 14 is provided at its circumference with a toothing 18 which engages a pinion 19 of an electric driving motor 20 mounted on the elevating platform 17 for operating the rotating stool 14. The upper end of the shaft 16 forms an upwardly extending centering pin 21 which engages the centering sleeve 12 on the foot plate 9 of the inserted rotating rack 2 (FIG. 1). Four working cylinders 22 are provided for vertically adjusting the elevating platform 17. The working cylinders 22 are actuated by a pressurized fluid. Their piston rods 23 are connected to the elevating platform 17. The working cylinders 22 are mounted to the underside of a mounting plate 24 which in turn is supported by an upper frame part 25 of the stand 1.

Figure 1:
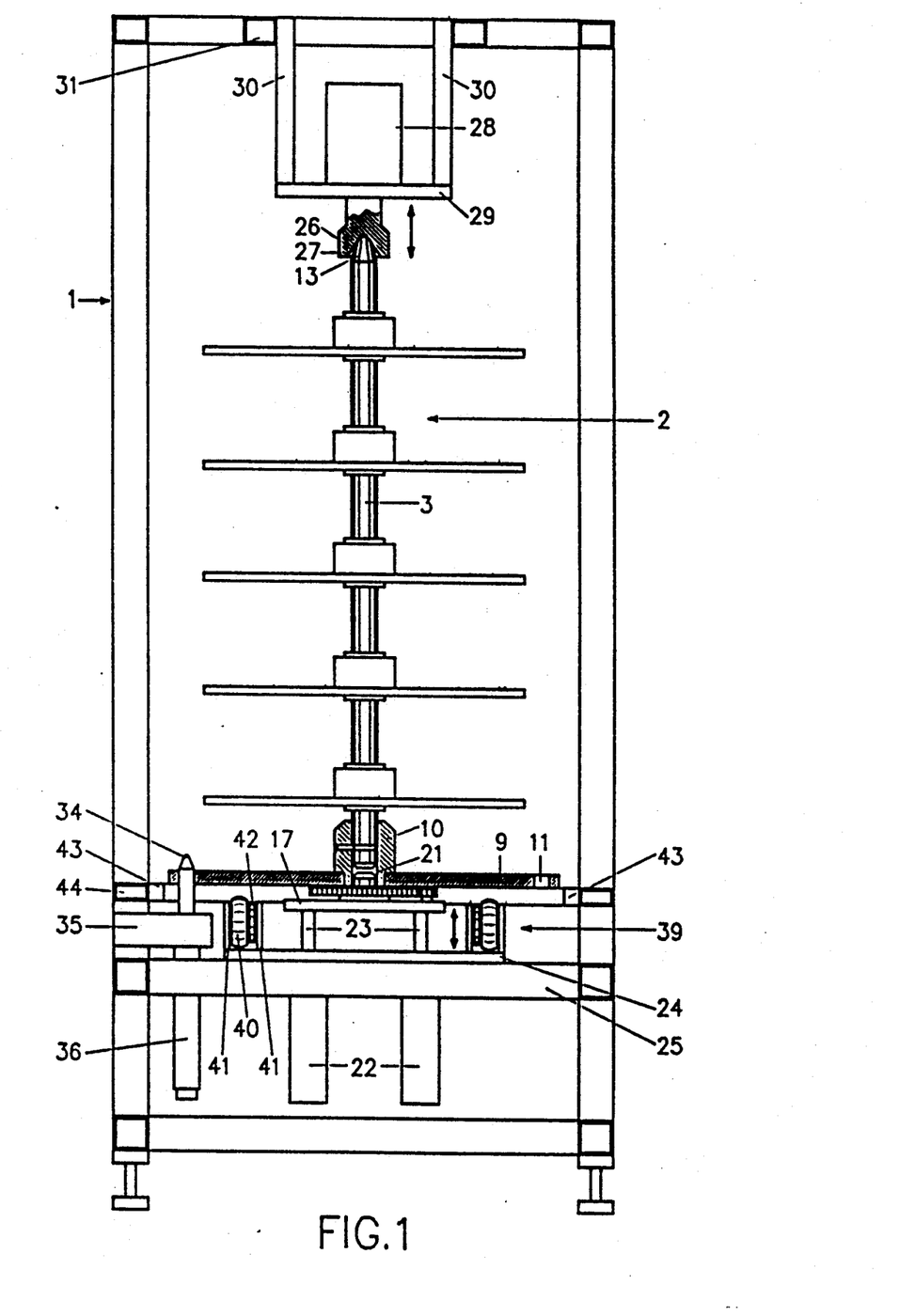
FIG. 1 is a front view of a magazine according to the invention comprising an exchangeable rotating rack.
Figure 2:
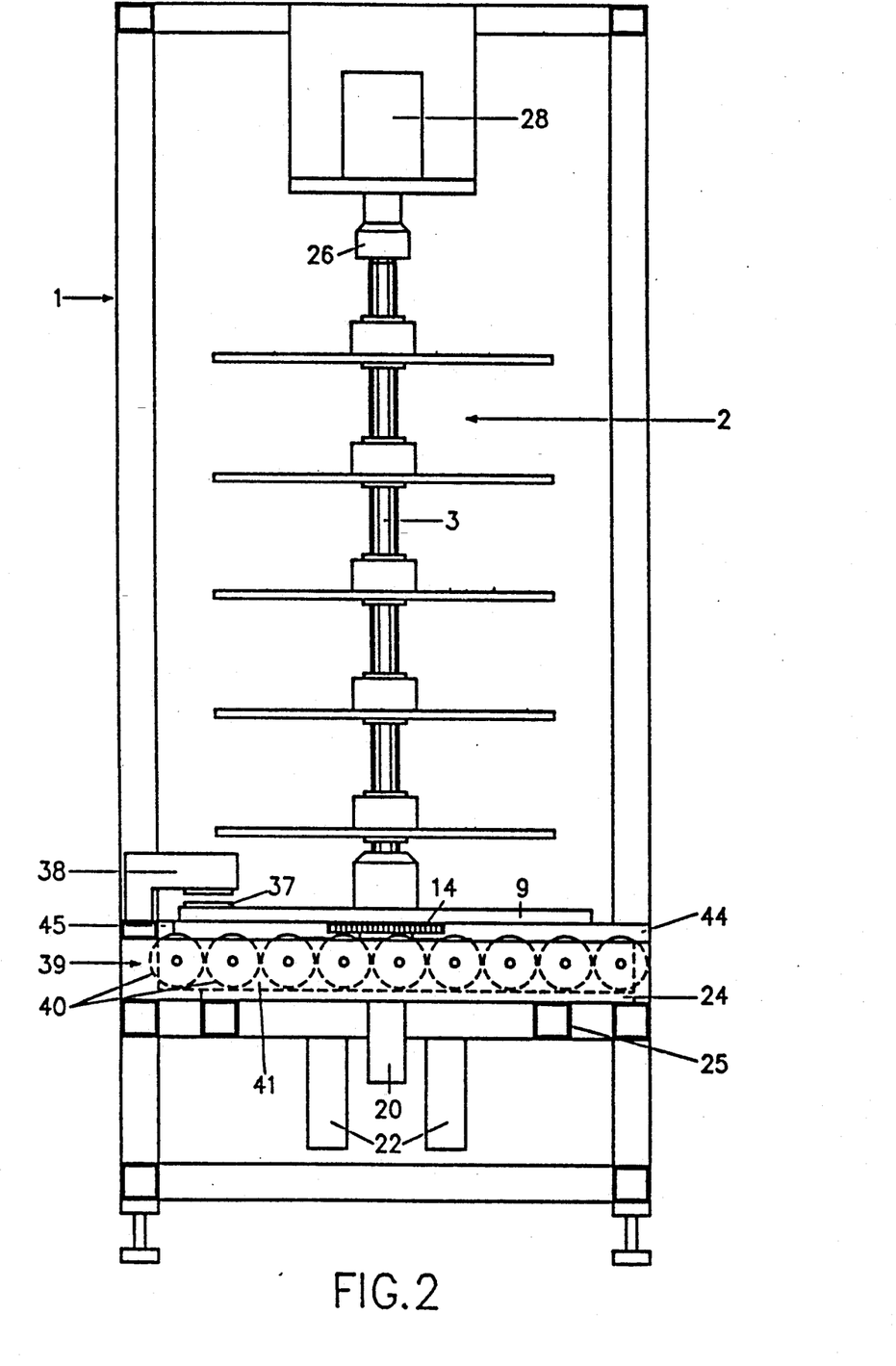
FIG. 2 is a side elevation of the magazine of FIG. 1.
Figure 8:
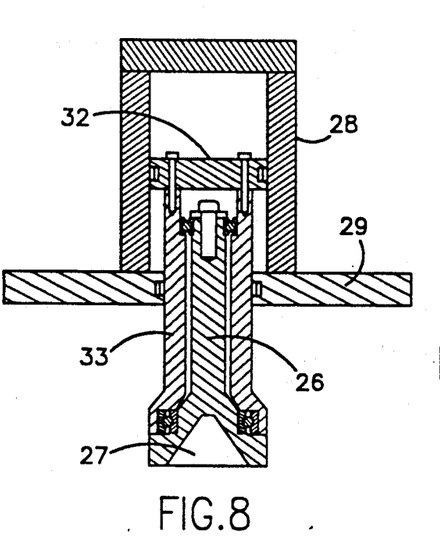
FIG. 8 is a sectional view, in a larger scale, of the upper clutch means in working order.

As shown in FIG. 1, the upper clutch means consist of a rotatable and vertically displaceable shaft end 26 comprising a downwardly open conic center hole 27 for taking up the centering cone 13 of the rotating support 3 of the rotating rack 2. The shaft end 26 is beared by a driving block 28 which in turn is supported by a platform 29 which is mounted to an upper frame part 25 of the stand 1 by means of supporting plates 30. As shown in detail in FIGS. 8 and 9, the driving block 28 is, as diagrammicly represented, a working cylinder comprising a pressure piston 32, the shaft end 26 being freely rotatably beared in the hollow piston rod 33.

When the magazine is in operation, the elevating platform 17 is, under the action of the working cylinder 22, in an upper end position (FIGS. 1, 2 and 6), and the pressurized working cylinder 28 pushes the shaft end 26, in the opposite direction of force, against the upper end 13 of the rotating support 3. Thereby, the centering pin 21 on the rotating stool 14 engages the centering sleeve 12 at the lower end of the rotating support 3, and the centering cone 13 at the upper end of the rotating support 3 engages the conic center hole 27 of the shaft end 26. In this manner, the rotating support 3 is interlockingly positioned and held between the rotating stool 14 and the shaft end 26, and the foot plate 14 is frictionally connected with the rotating stool 14.

A vertically movable locking pin 34 cooperating with the locking holes 11 of the foot plate 9 is provided, in a manner known per se, for fixing the rotating rack 2 in those angular positions which are planned for removing the objects to be handled 78 by means of a handling device 76. Said locking pin 34 is displaced by a working cylinder 36, mounted on the stand 1, by means of an intermediate supporting arm 35 (FIG. 1). Furthermore, an electronic storage device 37 is mounted at the rim of the foot plate 9. This electronic storage device 37 contains information for identifying the inserted rotating rack which information can be read by a reading device 38 mounted on the stand 1 (FIG. 2)

For exchanging the rotating rack 2, the stationary part of the magazine comprises a conveyer system 39 having a horizontal conveyer onto which the rotating rack 2 can be lowered. This conveyer system 39 is a roller conveyer mounted on the mounting plate 24. The rollers of the roller conveyer are beared in plane-parallel supporting plates 41 and are driven by means of chains 42 by a common driving motor (not shown). Guide rails 43 are provided at the circumference of the foot plate 9 along the conveyer on a frame part 44 of the stand 1, for longitudinally guiding the rotating rack 2 (FIGS. 1 and 3). A stopper 45 is mounted on the same frame part 44 (FIGS. 2 and 3). The foot plate 9 knocks against this stopper 45 when a rotating rack 2 on the conveyer system 39 is moved into the stand 1. In this way, the rotating rack 2 is stopped in the cenering area, so that the centering pin 21 can engage the centering sleeve 12, and the centering cone 13 can engage the conic center hole 27.

Figure 5:
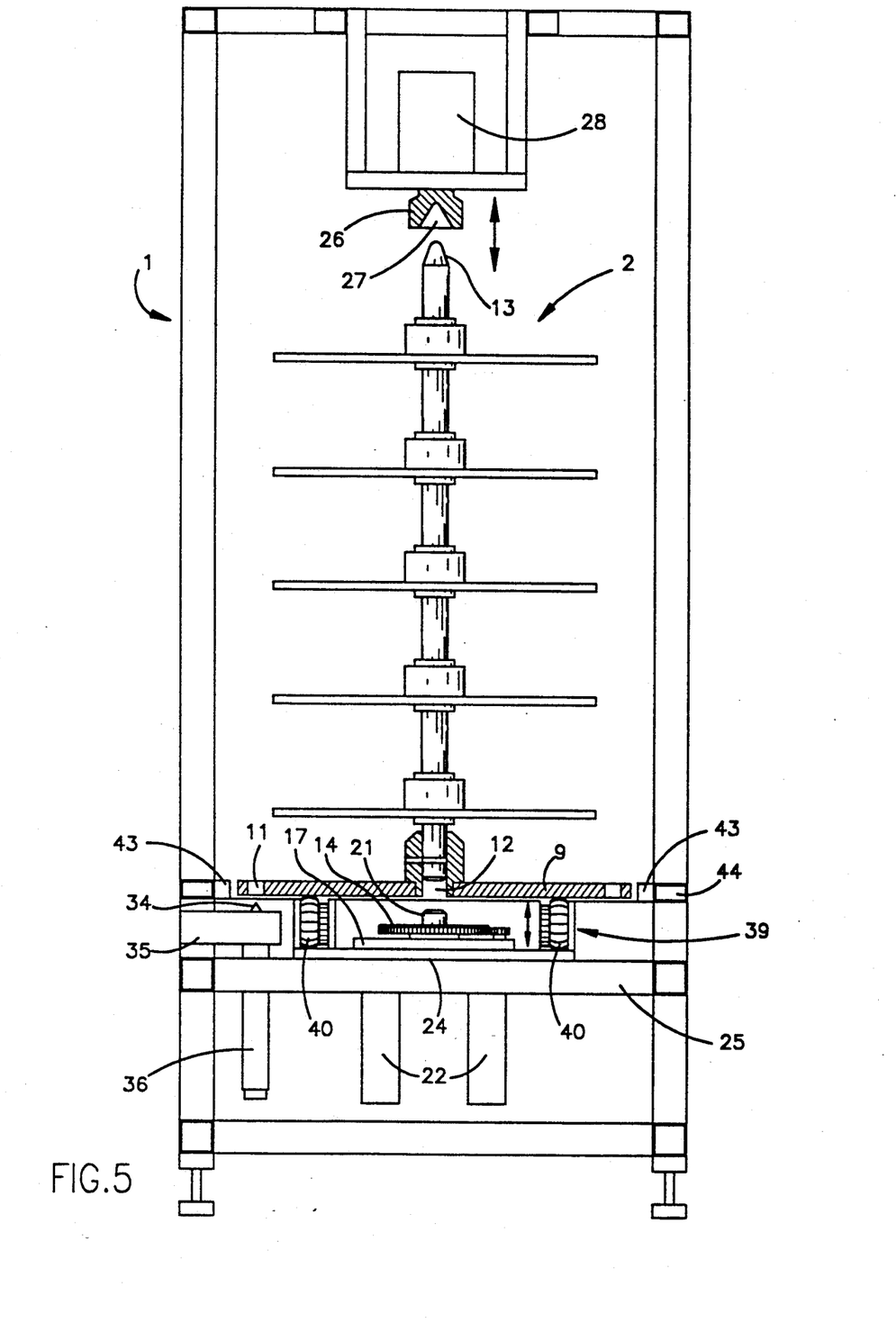
FIG. 5 is a front view of the magazine of FIG. 1 showing the conveyer system in a lowered position and the rotating rack disengaged from the clutch means.
Figure 9:
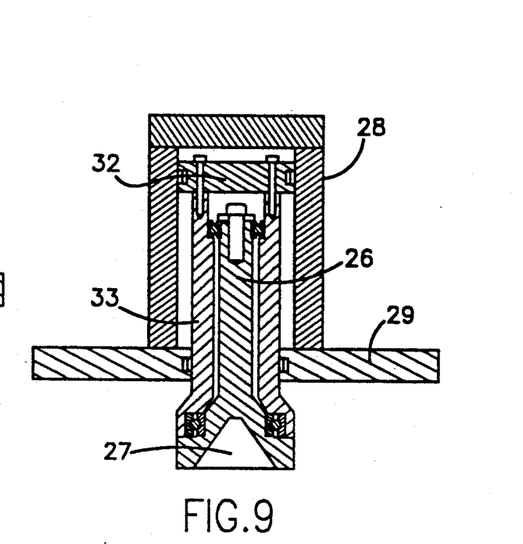
FIG. 9 is a sectional view analogous to FIG. 8, but showing the clutch means in disengaged position.

Removal of a rotating rack 2 is effected as follows: First, the rotating rack 2 is moved from the operating position shown in FIGS. 1 to 3 into the transporting position shown in FIG. 5, i.e. placed onto the conveyer system 39. For this purpose, the elevating platform 17 can be lowered from its operation position to a point where the centering pin 21 on the rotating stool 14 disengages from the centering sleeve 12 on the lower end of the rotating support 3 after the foot plate 9 was put onto the rollers 40. Thereby, the working cylinder 28 remains pressurized, thus maintaining the guiding effect at the upper end of the rotating support 3 during the downward movement. Thereafter, the shaft end 26 is upwardly drawn-off by counterpressurizing the working cylinder 28 for disengaging the centering cone 13 at the upper end of the rotating support 3 from the conic center hole 27 in the shaft end 26. By this, the rotating rack 2 is disengaged form the lower and upper clutch means, the final positions of which are shown in FIGS. 7 and 9. The rotating rack 2 can now be moved by the conveyer system 39 out from the stand 1 at its front side, as shown in FIG. 1, as soon as the locking pin 34 was downwardly withdrawn from the so far occupied locking hole 11 in the foot plate 9.

The construction of the pick-up place of the transfer station shown in FIGS. 10 and 11 again uses a stand 46 consisting e.g. of rectangular tubes and having a square horizontal projection. The height of this stand 46 approximately corresponds to the lower part of the magazine stand 1 which is limited by the frame part 44 (FIG. 1). A mounting plate 48 is supported by the middle frame part 47 of said stand 46. Said mounting plate 48 supports a conveyer system 49 having a horizontal conveying plane formed by two set of rollers 50. The conveyer system 49 is of essentially the same construction as the conveyer system 39 of the magazine, and its horizontal conveyer has the same level as that of the conveyer system 39. In the present application, the driving mechanism of the conveyer system 49 is also shown. It comprises a driving motor 51 mounted on a lower frame part 52 of the stand 46, and drives a common primary shaft 54 of the two set of rollers 50 by means of a chain drive 53.

Figure 10:
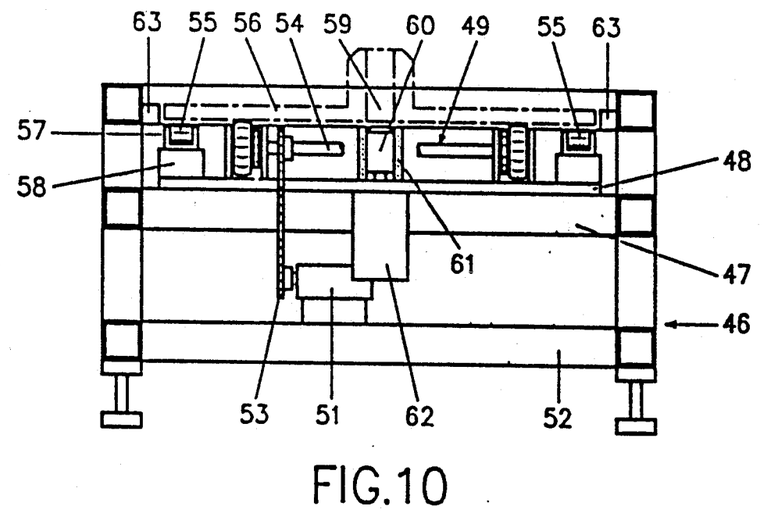
FIG. 10 is a front view of a pick-up place at the transfer station.
Figure 11:
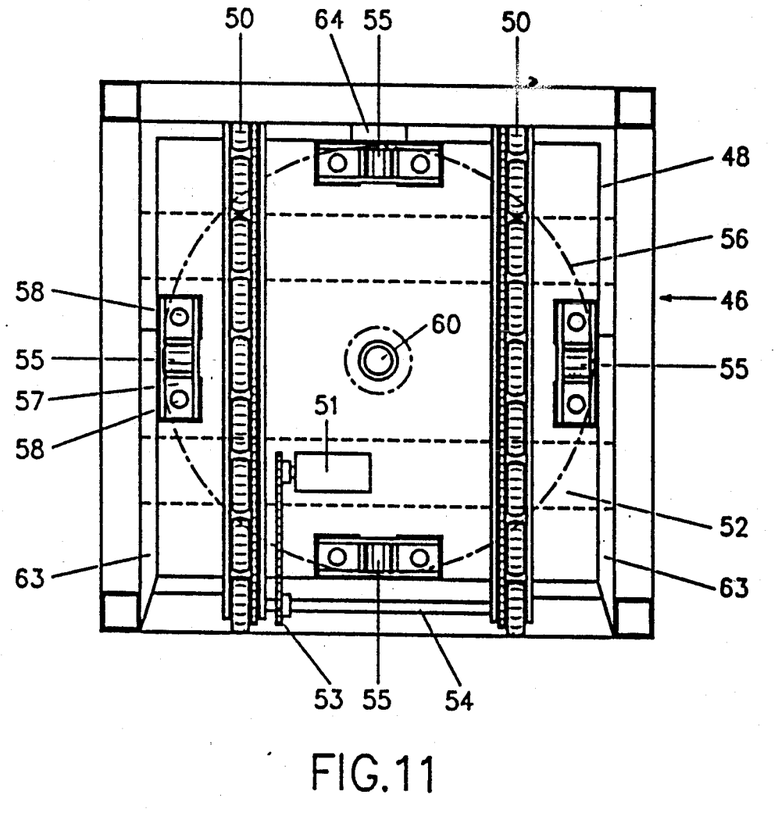
FIG. 11 is a horizontal projection of the pick-up place of FIG. 10.

The pick-up place of the transfer station, as shown, also comprises a bogie and a lifting device for transferring a rotating rack from the conveyer 49 to the bogie, and vice versa, allowing the rotating rack to be rotated during its transfer. Said bogie comprises a set of four rollers 55 arranged in a circle which support the foot plate 56 (shown in dot-dash lines) of the bogie. Each roller 55 is freely rotatably beared in a bearing block 57. Two lifting cylinders 58 supported by the mounting plate 48 act upon said bearing block 57. They are actuated together for lifting the rollers 55 from the conveying plane and to lower them to the conveying plane, respectively. The bogie also comprises a pivot 60 destined for engaging the centering sleeve 59 of the foot plate 56. The pivot 60 is guided in a bearing bush 61 provided above the mounting plate 48 and can be actuated by a lifting cylinder 62 provided below the mounting plate 48.

The lifting cylinder 58 and the lifting cylinder 62 are separately controllable in order to make the rollers 55 and the pivot 60 vertically move at different times. This possibility is used above all for transferring a rotating rack from the conveyer system 49 to the bogie. Thereby, first the pivot 60 is lifted for centering the rotating rack, and only then the rotating rack is lifted away from the sets of rollers 50 of the conveyer system 49 by the rollers 55 of the bogie. In a similar manner as for the magazine station, the deposited rotating rack is brought to the centering area by guide rails 63 arranged along the conveyer of the conveyer system 49 at the rim of the foot plate 55 and by a stopper 64 arranged at the end of the conveyer.

Figure 12:
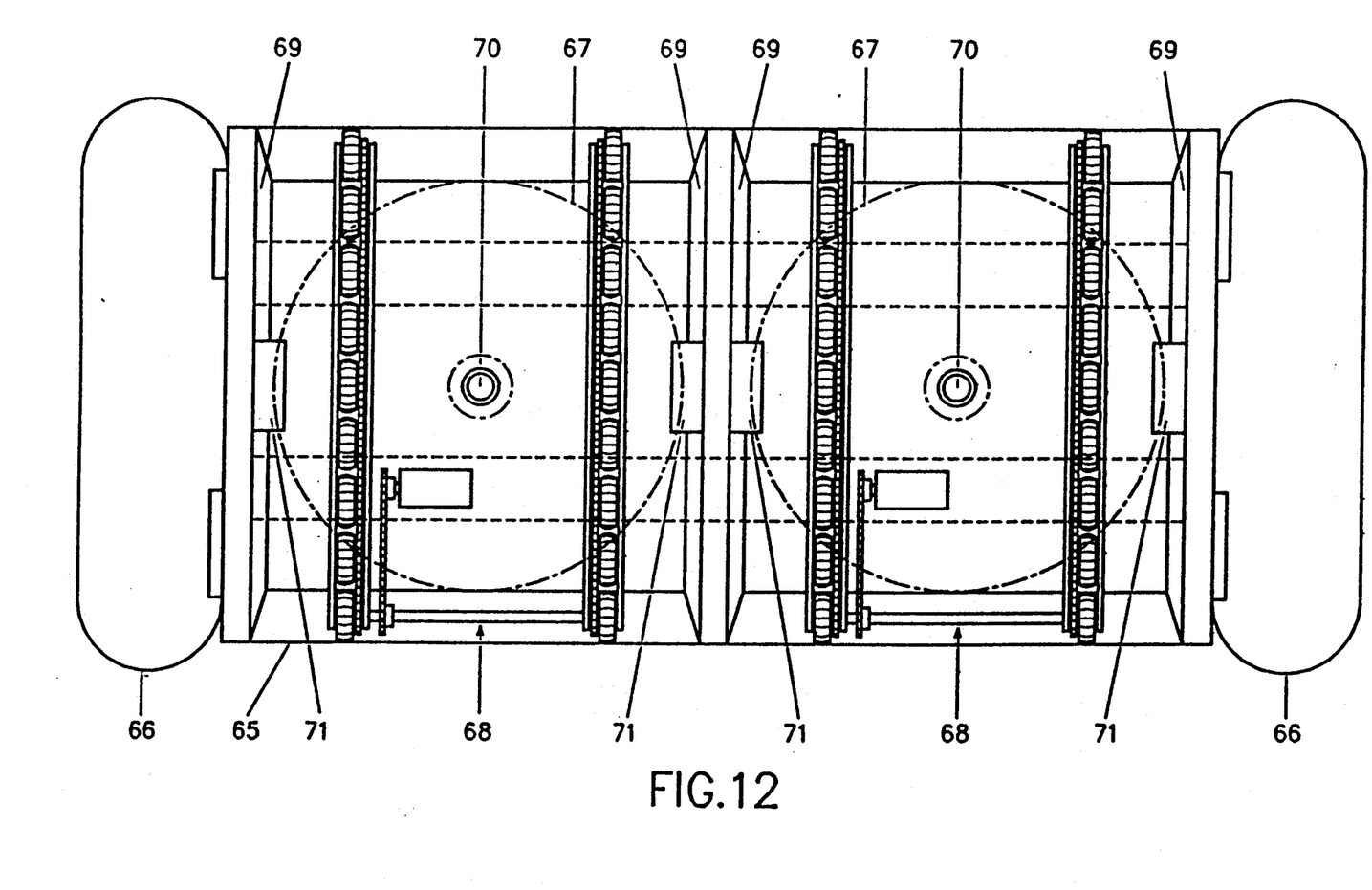
FIG. 12 is a horizontal projection of a floor conveying truck having two pick-up places for one rotating rack each.
Figure 13:
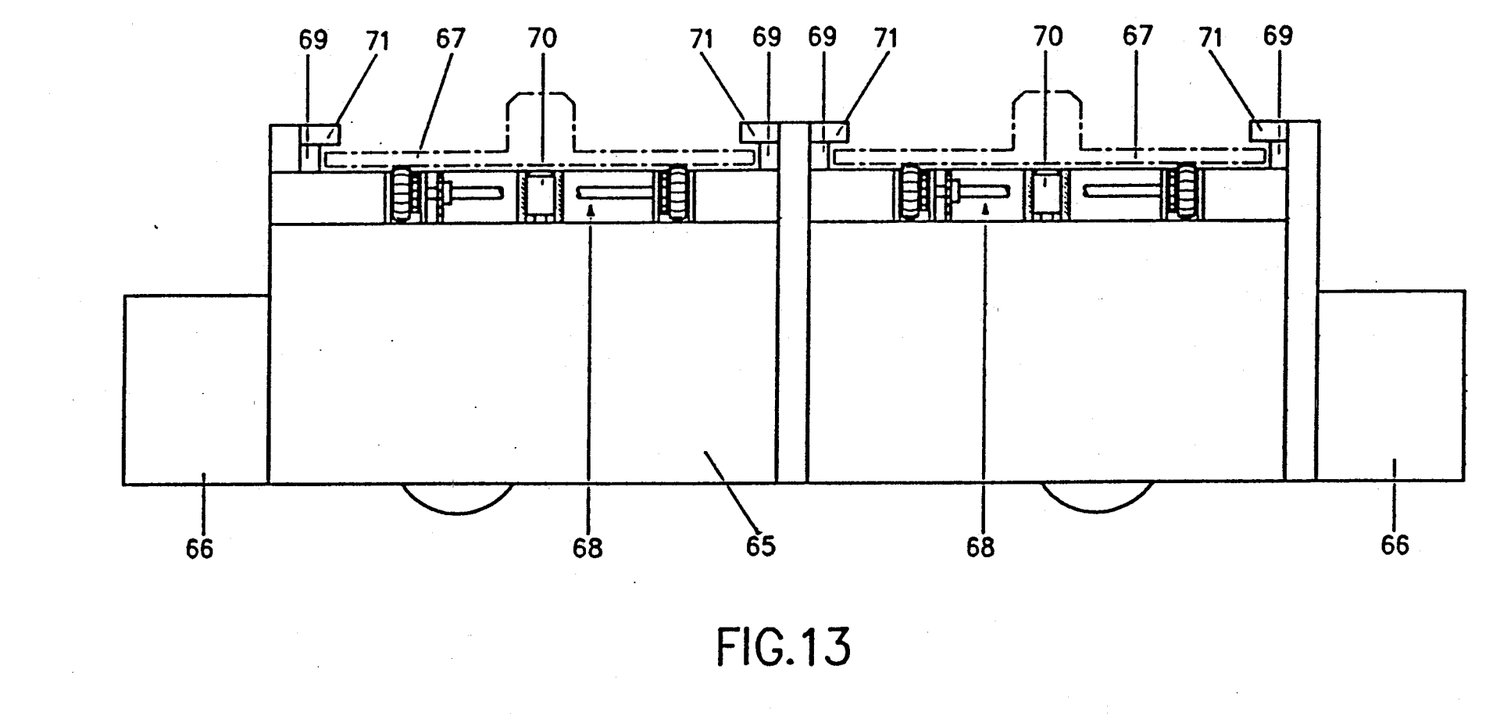
FIG. 13 is a side elevation of the floor conveying truck of FIG. 12.

FIGS. 12 and 13 show, mostly in a diagrammic representation, a floor conveying truck as used in particular in automaticly operated conveyer systems. The means for the remote control of such floor conveying trucks are known per se, and are not explained here in detail. The whole understructure of the vehicle, inclusive of the undercarriage, is marked by "65". Bumpers 66 are arranged at both ends of the vehicle understructure 65 in a manner known per se.

The superstructure of the vehicle comprises two pick-up places for one rotating rack each, the foot plate 67 of which is shown in dot-dash lines. Each pick-up place is in turn provided with a conveyer system 68 having a horizontal conveyor of the kind described above. Here too, the conveyers have the same level as that of the magazine station and of the transfer station. Details of these conveyer devices may be taken from the description referring to FIGS. 10 and 11. The pick-up places are arranged in such a manner that the vehicle can be loaded and unloaded from both sides. For this purpose, the guide rails acting on the rim of the foot plate 67 extend over the whole length of the conveyer and the whole width of the vehicle, respectively. For fixing the rotating racks put down on the vehicle during transport, the construction comprises, on the one hand, pivots 70, arranged in the center of the pick-up places, which are vertically movable in the same way as the pivots 60 in FIGS. 10 and 11, and, on the other hand, retaining shoulders 71 overgripping the foot plate 67.

The pivots 60 are destined for engaging the centering sleeve of the rotating rack put on thereby securing the rotating rack against lateral displacement, whereas the retaining shoulders 71 prevent the rotating rack from tipping.

Figure 14:
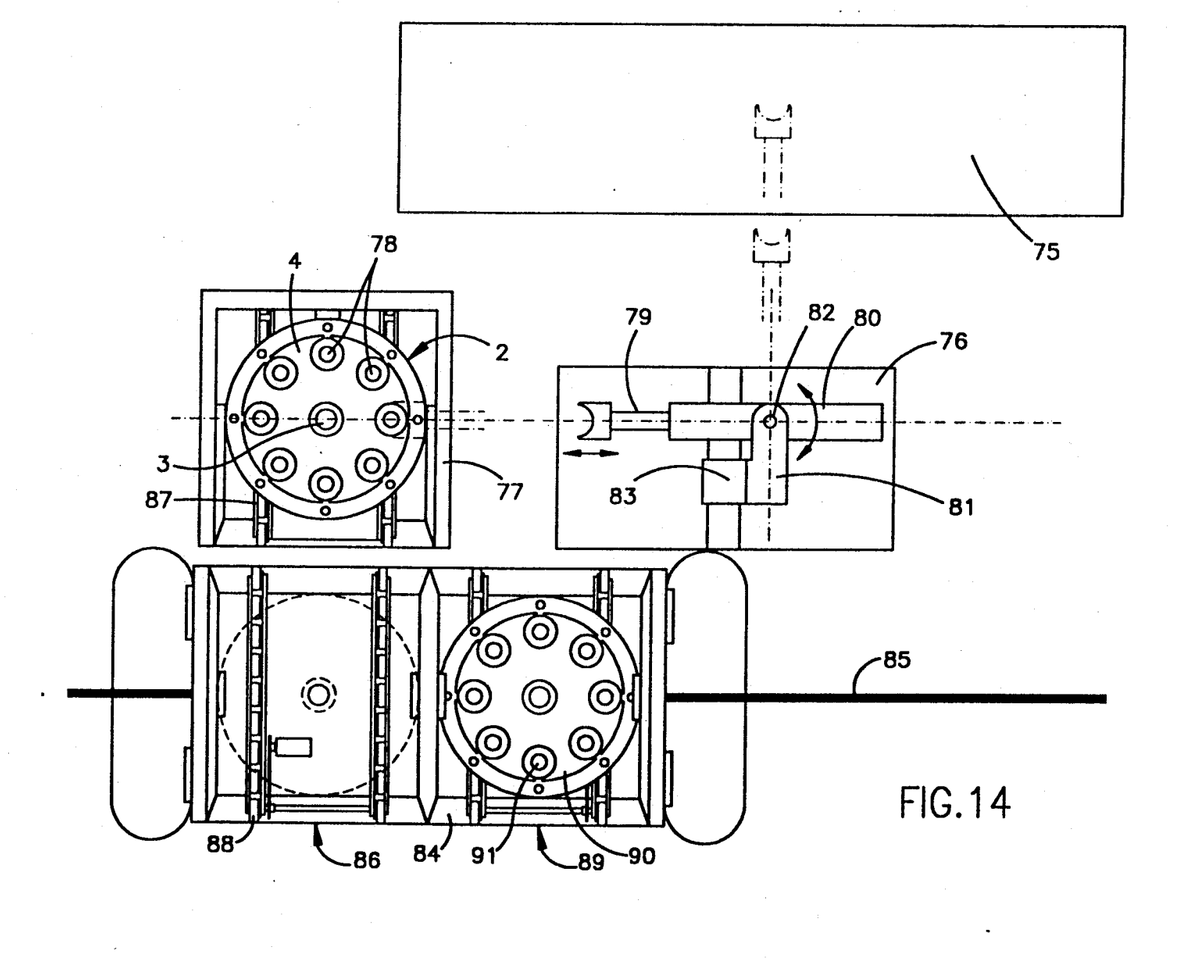
FIG. 14 is a diagrammic representation of a manufacturing cell comprising a processing device, a magazine station, and a handling device, as well as of a floor conveying truck.

FIG. 14 diagrammicly represents, as an example, the layout of a simple manufacturing plant, comprising a processing device 75, a handling device 76, and a magazine 77, said magazine 77 comprising an exchangeable rotating rack 2 of the construction shown in FIGS. 1 to 9 bearing symbolically traced tools and workpieces 78, respectively. The handling device 76 comprises three controlled axles and a grip arm 79 which is mounted in a longitudinally movable manner in a bearing part 80. The bearing part 80 is mounted on a carriage 81 and is rotatable around the axis 82 which in turn is mounted on a stationary support 83 in a vertically movable manner. The various phases of movement of the grip arm 79 during the exchange of tools and workpieces, respectively, are traced in dot-dash lines.

FIG. 14 clearly shows that the auxiliary devices take only relatively limited space of the station, and that the handling device 76 needs only limited moving space. This advantage is due to the fact that even in a prolonged operation of the manufacturing plant, one sole magazine 77 of the kind described above is sufficient, and that thus, for the exchange of the objects to be handled, the action of the grip arm 79 is limited to this sole magazine 77.

FIG. 14 also shows a floor conveying truck 84, designed e.g. as shown in FIGS. 12 and 13, which is moved, in a manner known per se, by means of an induction loop 85 along the course of the latter near to the magazine station 77. In FIG. 14, the truck 84 is in a first stop position in which its vacant pickup place 86 is exactly opposite to the magazine station 77. Thus, the rotating rack 2 to be exchanged can be transferred from the magazine station 77 to the truck 84 with the aid of the conveyer systems 87 and 88. The rotating rack 90 containing the tools and workpieces 91, respectively, which are necessary for continuing the manufacturing, and destined for replacing the rotating rack 2, is meanwhile waiting at the second pick-up place 89. By advancing the truck 84, the occupied pick-up place is aligned to the magazine station 77, for transferring the new rotating rack 90 to the pick-up place of the magazine station which now is vacant. In this manner, the exchange of the rotating racks 2 and 90 can be effected fully automated by means of appropriate control systems.

Figure 15:
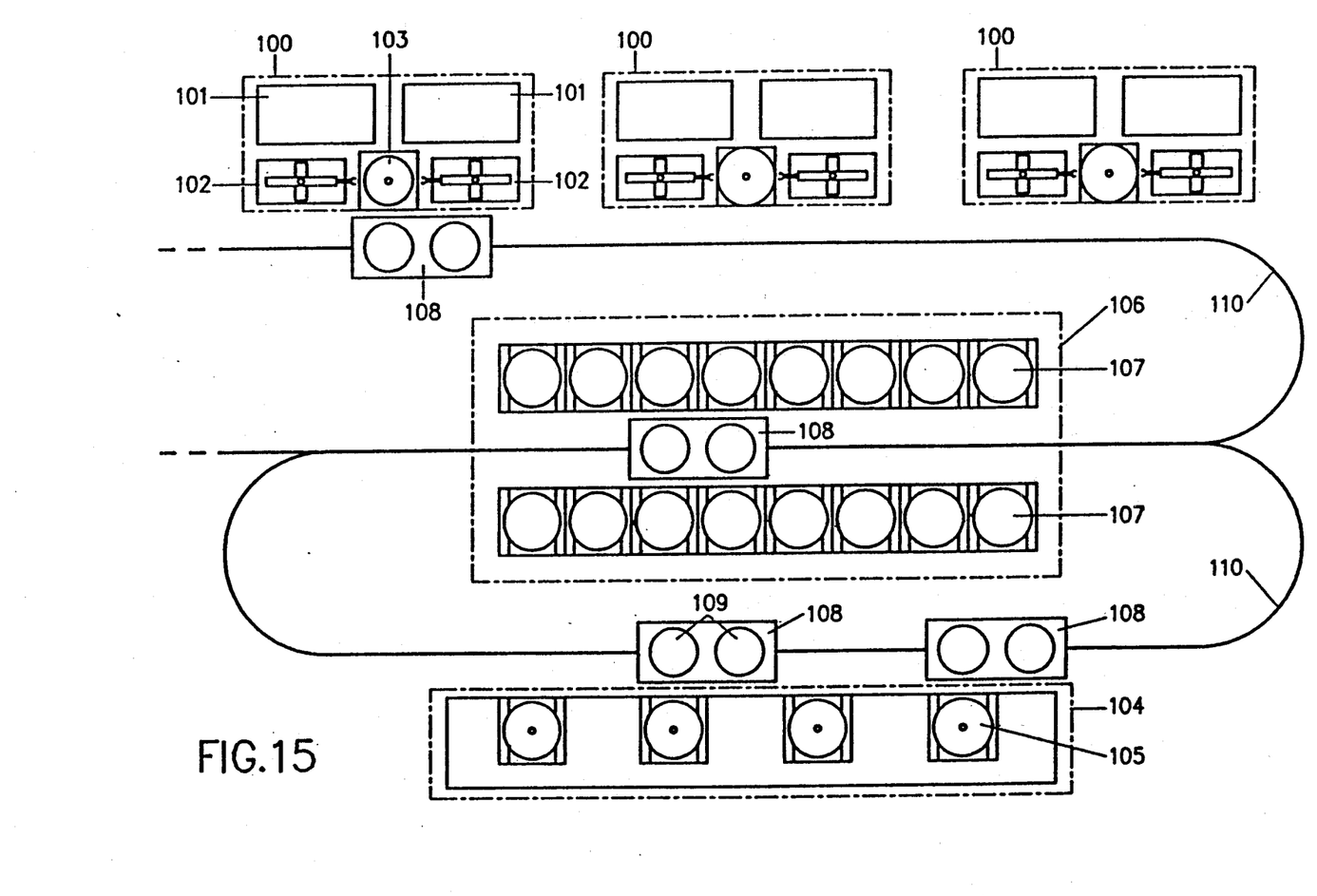
FIG. 15 is a diagrammic representation of a manufacturing plant comprising a plurality of manufacturing cells, a plurality of floor conveying trucks, a tranfer station and a buffer stock.

FIG. 14 diagrammicly represents a manufacturing plant, comprising a plurality of manufacturing cells 100, e.g. three cells, comprising two processing devices 101 each; two handling devices 102 individually associated with the processing devices 101; and a common magazine 103 for the objects to be handled; and a transfer station 104 comprising a plurality of pick-up places 105, e.g. four places, and a buffer stock 106 having a plurality of pick-up places 107 for the exchangeable rotating racks.

Automaticly operated and guided floor conveying trucks 108, of the kind described above, having two pick-up places 109 each, serve for transporting the rotating racks between the transfer station 104, the buffer stock 106 and the manufacturing cells. However, floor conveying trucks comprising more than two pick-up places may be used as well. In the present example, the lane defined by the induction loops 110 runs along the manufacturing cells 100. Thus, said manufacturing cells are communicationwise directly linked to one another, and the rotating racks with the tools and workpieces, respectively, stored therein can be directly transmitted farther from one manufacturing cell to the next manufacturing cell, in accordance with the required sequence. Of course, in other applications, the manufacturing cells ma by radially linked to the transfer station 104 and the buffer stock 106, respectively.

What is claimed is:

1. A manufacturing plant comprising:
at least one manufacturing cell including a workpiece processing means and handling means associated with the processing means and adapted to automatically exchange tools and/or workpieces on the processing means;
each manufacturing cell including magazine means located in the reach of the handling means and for the workpieces to be handled, the magazine means including a stationary part;
a plurality of rotating racks designed as transportable constructional units exchangeably insertable in the stationary part of the magazine means, each rotating rack having a rotating support and a plurality of storing planes stacked on the rotating support, one of the plurality of rotating rack being inserted in the stationary part of the magazine means;
the stationary part of the magazine means comprising means for rotating the rotating rack which is inserted in the stationary part;
a transfer station separate from the manufacturing cell for loading and unloading rotating racks;
transporting means for transporting rotating racks between the transfer station and the stationary part of the magazine means;
the transfer station comprising a buffer stock for intermediately stocking rotating racks prepared for use in the magazine means;
each rotating rack comprising at a lower end of its rotating support a foot plate forming a base member for transporting the rotating rack in an upright position;
the transporting means comprising at least one floor conveying truck, the floor conveying truck and the transfer station comprising pick-up places for one rotating rack each, the pick-up places comprising holding means for transporting and for handling the rotating racks in the transfer station;
the stationary part of the magazine means and each of the pick-up places of the floor conveying truck and of the transfer station comprise one conveyor system for transferring the rotating racks from the magazine means to the floor conveying truck and from the latter to the transfer station, each conveyor system having a horizontal conveyor, the conveyors of all conveyor systems being located on an even level; and
guide means mounted along the conveyor of each conveyor system at the rim of the foot plate for longitudinally guiding the rotating rack.

2. A manufacturing plant comprising:
at least one manufacturing cell including a workpiece processing means and handling means associated with the processing means and adapted to automatically exchange tools and/or workpieces on the processing means;
each manufacturing cell including magazine means located in the reach of the handling means and for the workpieces to be handled, the magazine means including a stationary part;
a plurality of rotating racks designed as transportable constructional units exchangeably insertable in the stationary part of the magazine means, each rotating rack having a rotating support and a plurality of storing planes stacked on the rotating support, one of the plurality of rotating rack being inserted in the stationary part of the magazine means;
the stationary part of the magazine means comprising means for rotating the rotating rack which is inserted in the stationary part;
a transfer station separate from the manufacturing cell and for loading and unloading rotating racks;
transporting means for transporting rotating racks between the transfer station and the stationary part of the magazine means;
the transfer station comprising a buffer stock for intermediately stocking rotating racks prepared for use in the magazine means;
each rotating rack comprising at a lower end of its rotating support a foot plate forming a base member for transporting the rotating rack in an upright position;
the transporting means comprising at least one floor conveying truck, the floor conveying truck and the transfer station comprising pick-up places for one rotating rack each, the pick-up places comprising holding means for transporting and for handling the rotating racks in the transfer station;
the stationary part of the magazine means and each of the pick-up places of the floor conveying truck and of the transfer station comprise one conveyor system for transferring the rotating racks from the magazine means to the floor conveying truck and from the latter to the transfer station, each conveyor system having a horizontal conveyor, the conveyors of all conveyor systems being located on an even level; and
the conveyor of the conveyor systems which are associated with the magazine means and the transfer station comprises a stopper for stopping the incoming rotating rack in the area of action of the respective holding means.

3. A manufacturing plant comprising:
at least one manufacturing cell including a workpiece processing means and handling means associated with the processing means and adapted to automatically exchange tools and/or workpieces on the processing means;
each manufacturing cell including magazine means located in the reach of the handling means and for the workpieces to be handled, the magazine means including a stationary part;
a plurality or rotating racks designed as transportable constructional units exchangeably insertable in the stationary part of the magazine means, each rotating rack having a rotating support and a plurality of storing planes stacked on the rotating support, one of the plurality of rotating rack being inserted in the stationary part of the magazine means;
the stationary part of the magazine means comprising means for rotating the rotating rack which is inserted in the stationary part, the means for rotating the rotating rack including first hydraulic means located at one end of the rotating rack and second hydraulic means located at an opposite end of the rotating rack, the first and second hydraulic means cooperating with each other to enable the rotating rack to rotate on the rotating support;

a transfer station separate from the manufacturing cell and for loading and unloading rotating racks; and transporting means for transporting rotating racks between the transfer station and the stationary part of the magazine means.

4. A manufacturing plant according to claim 3, wherein the transfer station comprises a buffer stock for intermediately stocking rotating racks prepared for use in the magazine means.

5. A manufacturing plant according to claim 3, wherein the transporting means for the rotating racks comprises at least one floor conveying truck.

6. A manufacturing plane according to claim 5, further comprising another manufacturing cell and means for automatically operating and guiding the at least one floor conveying truck on lanes connecting the magazine means of the manufacturing cells with one another and with the transfer station.

7. A manufacturing plant according to claim 4, wherein the transfer station comprises pickup-places and lanes between the pick-up places of the transfer station and the buffer stock.

8. A manufacturing plant according to claim 4, wherein each rotating rack comprises at a lower end of its rotating support a foot plate forming a base member for transporting the rotating rack in an upright position.

9. A manufacturing plant according to claim 8, wherein the floor conveying truck and the transfer station comprise pick-up places for one rotating rack each, the pick-up places comprising holding means for transporting and for handling the rotating racks in the transfer station.

10. A manufacturing plant according to claim 9, wherein the floor conveying truck comprises at least two pick-up places for one rotating rack each.

11. A manufacturing plant according to claim 9, wherein the transfer station comprises at least one pick-up place for one rotating rack.

12. A manufacturing plant according to claim 9, wherein the stationary part of the magazine means and each of the pick-up places of the floor conveying truck and of the transfer station comprise one conveyor system each, for transferring the rotating racks from the magazine means to the floor conveying truck and from the latter to the transfer station, each conveyor system having a horizontal conveyor, the conveyers of all conveyor systems being located on an even level.

13. A manufacturing plant according to claim 12, wherein the conveyor systems include roller conveyors comprising jointly driven rollers.

14. A manufacturing plant comprising:
at least one manufacturing cell including a workpiece processing means and handling means associated with the processing means and adapted to automatically exchange tools and/or workpieces on the processing means;
each manufacturing cell including magazine means located in the reach of the handling means and for the workpieces to be handled, the magazine means including a stationary part;
a plurality or rotating racks designed as transportable constructional units exchangeably insertable in the stationary part of the magazine means, each rotating rack having a rotating support and a plurality of storing planes stacked on the rotating support, one of the plurality of rotating rack being inserted in the stationary part of the magazine means;
the stationary part of the magazine means comprising means for rotating the rotating rack which is inserted in the stationary part;
a transfer station separate from the manufacturing cell and for loading and unloading rotating racks;
transporting means for transporting rotating racks between the transfer station and the stationary part of the magazine means;
the transfer station comprising a buffer stock for intermediately stocking rotating racks prepared for use in the magazine means;
each rotating rack comprising at a lower end of its rotating support a foot plate forming a base member for transporting the rotating rack in an upright position;
the transporting means comprising at least one floor conveying truck, the floor conveying truck and the transfer station comprising pick-up places for one rotating rack each, the pick-up places comprising holding means for transporting and for handling the rotating racks in the transfer station;
the stationary part of the magazine means and each of the pick-up places of the floor conveying truck and of the transfer station comprise one conveyor system for transferring the rotating racks from the magazine means to the floor conveying truck and from the latter to the transfer station, each conveyor system having a horizontal conveyor, the conveyors of all conveyor systems being located on an even level; and
each pick-up place of the transfer station comprising a bogie and a lifting device for transferring a rotating rack between the conveyor system and the bogie.

15. A manufacturing plant according to claim 14, wherein the rotating rack inserted in the stationary part of the magazine means is freely rotatable when placed with its foot plate on the bogie.

16. A manufacturing plant according to claim 14, wherein the bogie comprises a set of rollers arranged in a circle, and a pivot adapted to engage a centering sleeve on the foot plate of the rotating rack, the set of rollers and the pivot being individually movable in vertical direction by means of a lifting device.

17. A manufacturing plant comprising:
at least one manufacturing cell including a workpiece processing means and handling means associated with the processing means and adapted to automatically exchange tools and/or workpieces on the processing means;
each manufacturing cell including magazine means located in the reach of the handling means and for the workpieces to be handled, the magazine means including a stationary part;
a plurality of rotating racks designed as transportable constructional units exchangeably insertable in the stationary part of the magazine means, each rotating rack having a rotating support and a plurality of storing planes stacked on the rotating support, one of the plurality of rotating rack being inserted in the stationary part of the magazine means;
the stationary part of the magazine means comprising means for rotating the rotating rack which is inserted in the stationary part;

a transfer station separate from the manufacturing cell and for loading and unloading rotating racks;

transporting means for transporting rotating racks between the transfer station and the stationary part of the magazine means;

the transfer station comprising a buffer stock for intermediately stocking rotating racks prepared for use in the magazine means;

each rotating rack comprising at a lower end of its rotating support a foot plate forming a base member for transporting the rotating rack in an upright position;

the transporting means comprising at least one floor conveying truck, the floor conveying truck and the transfer station comprising pick-up places for one rotating rack each, the pick-up places comprising holding means for transporting and for handling the rotating racks in the transfer station;

the stationary part of the magazine means and each of the pick-up places of the floor conveying truck and of the transfer station comprise one conveyor system for transferring the rotating racks from the magazine means to the floor conveying truck and from the latter to the transfer station, each conveyor system having a horizontal conveyor, the conveyors of all conveyor systems being located on an even level; and retaining shoulders arranged along the conveyor of the conveyor system associated with the floor conveying truck, the retaining shoulders overlapping the foot plate of the rotating rack.

18. A manufacturing plant comprising:

at least one manufacturing cell including a workpiece processing means and handling means associated with the processing means and adapted to automatically exchange tools and/or workpieces on the processing means;

each manufacturing cell including magazine means located in the reach of the handling means and for the workpieces to be handled, the magazine means including a stationary part;

a plurality of rotating racks designed as transportable constructional units exchangeably insertable in the stationary part of the magazine means, each rotating rack having a rotating support and a plurality of storing planes stacked on the rotating support, one of the plurality of rotating rack being inserted in the stationary part of the magazine means;

the stationary part of the magazine means comprising means for rotating the rotating rack which is inserted in the stationary part;

a transfer station separate from the manufacturing cell for loading and unloading rotating racks;

transporting means for transporting rotating racks between the transfer station and the stationary part of the magazine means; and the stationary part of the magazine means comprises a stand provided with disengageable clutch means for bearing and driving the rotating rack.

19. A manufacturing plant according to claim 18, wherein the disengageable clutch means cooperates with both ends of the rotating support of the rotating rack.

20. A manufacturing plant according to claim 19, wherein:

the rotating support of the rotating rack is provided at its lower end with a foot plate having a centering sleeve which is downwardly open, and at its upper end with a centering cone;

the lower part of the stand comprises a driven rotating stool bearing the rotating rack, the rotating stool being provided with an upwardly extending centering pin engaging into the centering sleeve of the foot plate;

the upper part of the stand comprises a shaft end provided with a downwardly open, freely rotatable conic center hole for taking up the centering cone of the rotating support; and the rotating stool together with a turnable drive unit for rotating the same are mounted on an elevating platform, the elevating platform pushing the rotating rack upwardly, in order to interlockingly position and hold the rotating support of the rotating rack between the rotating stool and the shaft end, and to frictionally connect the foot plate with the rotating stool.

21. A manufacturing plant according to claim 20, wherein:

the rotating rack can be lowered from its operation position to a point where its foot plate touches the conveyor; and the clutch means upon disengagement from the rotating rack releases the latter in the conveying direction.

22. A manufacturing plant according to claim 21, wherein:

the elevating platform can be lowered from its operation position to a point where the centering pin on the rotating stool disengages the centering sleeve on the lower end of the rotating support after the rotating rack was put down onto the conveyor system; and the shaft end can upwardly be drawn-off for disengaging the centering cone on the upper end of the rotating support form of the conic center hole on the shaft end, thereby allowing that the disengagement of the rotating rack from the disengageable clutch means must be effected in two phases, whereby (i) in the first phase the rotating rack is moved down onto the conveyer system while the upper clutch means is still engaged and the lower clutch means is disengaged, and (ii) in the second phase the upper clutch means is disengaged from the rotating rack.

* * * * *